United States Patent [19]

Gordon, III

[11] Patent Number: 4,468,881
[45] Date of Patent: Sep. 4, 1984

[54] SKIRTED PLASTIC WORM

[76] Inventor: Leslie L. Gordon, III, 603 St. Monica, Cahokia, Ill. 62206

[21] Appl. No.: 378,617

[22] Filed: May 17, 1982

[51] Int. Cl.³ .................... A01K 85/00; A01K 85/01
[52] U.S. Cl. .............................. 43/42.25; 43/42.28; 43/42.31
[58] Field of Search .............. 43/42.31, 42.25, 42.24, 43/42.28; D22/27

[56] References Cited

U.S. PATENT DOCUMENTS

| | | | |
|---|---|---|---|
| D. 270,854 | 10/1983 | Neese | D22/27 |
| 1,336,227 | 4/1920 | Hayes | 43/42.28 |
| 2,618,094 | 11/1952 | Shindler | 43/42.24 |
| 3,120,074 | 2/1964 | Messler | 43/42.31 X |
| 3,564,754 | 2/1971 | Brawley et al. | 43/42.28 X |
| 3,590,514 | 7/1971 | Begley | 43/42.28 X |
| 3,760,528 | 9/1973 | Moore | 43/42.31 X |
| 3,802,115 | 4/1974 | Auten et al. | 43/42.31 |
| 3,803,747 | 4/1974 | Cartwright | 43/42.28 X |
| 3,935,660 | 2/1976 | Plew | 43/42.31 |
| 4,033,063 | 7/1977 | Mize | 43/42.28 X |
| 4,074,454 | 2/1978 | Cordell | 43/42.28 |
| 4,158,927 | 6/1979 | Capra | 43/42.28 X |
| 4,203,246 | 5/1980 | Sacharnoski, Sr. | 43/42.31 |

Primary Examiner—Nicholas P. Godici
Assistant Examiner—P. Weston Musselman, Jr.
Attorney, Agent, or Firm—Glenn K. Robbins

[57] ABSTRACT

A plastic worm fishing lure having a double action inner and outer skirt. The skirt is attached at the gland portion of the worm body by a tie binding and has a rearwardly extending inner skirt and a longer forwardly extending outer skirt which doubles back to the rear over the inner skirt as the lure is pulled through the water. The plastic worm body may be provided with a molded in-situ sealed buoyant sound chamber partially filled with shot which produces sound vibrations as the lure is moved through the water. The sound chamber is located at the head section of the worm body to provide buoyancy to lift the head end with respect to the tail end when the lure is immersed in the water.

10 Claims, 3 Drawing Figures

SKIRTED PLASTIC WORM

BACKGROUND OF THE INVENTION

Plastic worms have long been employed as artificial lures for fishing for bass and other fish. Such plastic worms are conventionally of an elongated flexible nature and have a head portion, intermediate gland portion and a tail portion. Generally, they are fished with a hook inserted through the head with the hook being turned around inside the body with the barb being pointed to the front to hook a fish that has been attracted to the lure either as potential food or, in anger or for any other reason inciting the fish to attack the lure.

The so-called live action presented by the lure has long been an object sought after by fishermen and lure manufacturers to present to the fish a natural live look as distinct from an artificial look.

This live action is desirably presented as much as possible during the entire time the lure is in the water to maximize the fish attracting capacity of the lure. When a plastic worm is cast and allowed to drop through the water this live action has been difficult to present due to the free fall nature as distinct from the slow spasmodic retrieve when the lure is being reeled in.

SUMMARY OF THE INVENTION

By means of this invention there has been provided an improved plastic worm fishing lure. The lure in essence is constituted of a conventional plastic worm which has incorporated into its structure a double action rubber skirt comprised of a short inner skirt and a longer outer skirt. The skirt is doubled over to provide a life-like action as the plastic worm is pulled through the water or retrieved in the usual fashion through the water.

The skirt is desirably attached by a nylon or soft wire binding to provide a short rear length skirt and a longer forward length skirt. When the lure is pulled through the water the longer skirt, because of the flexible nature of the rubber-like strands constituting the skirt structure is doubled back to the rear to enclose the shorter inner rear skirt portion to provide a unique life-like lure presentation.

The skirt is made of slitted shreddable rubber and is simply fitted around the plastic worm and affixed thereto preferably at the forward portion of the gland or sex band of the worm. Aftr affixation by the tie around binding the rear and forward portions of the skirt are pulled apart to form the flexible grass-like strands forming the inner and outer portions, respectively, of the skirt.

The lure of this invention may be fished in the same manner as conventional plastic worms or jig and eel lures. By means of the double action inner and outer skirt, greater action is provided by the flexible strands as the lure drops through the water in the initial cast and in the various forms of retrieval employed in "working" the lure.

Another feature of the invention resides in the employment of a glass sound chamber partially filled with metallic shot which is molded in the plastic worm. This chamber which may be simply formed of hollow glass tubing sealed at the ends contains shot such as steel shot which rattles against the glass as the plastic worm is moved through the water. The sound vibration serves as an attraction to the fish and in murky water aids the fish in locating the lure.

The glass sound chamber is preferably molded into the forward portion of the plastic worm in the forward portion of the worm. In this region the added buoyancy tends to lift the head of the worm as distinct from a conventional plastic worm which is normally "head heavy".

The double action skirted plastic worm and glass sound chamber may be employed by fishermen in the same manner as conventional plastic worms, jig and eel and flexible plastic grubs. The invention may likewise be incorporated in such plastic grubs and other elongated flexible plastic worm or grub lures and it will be understood that when speaking of plastic worms such flexible plastic grubs are included.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWING

DESCRIPTION OF THE INVENTION

Figure 1:
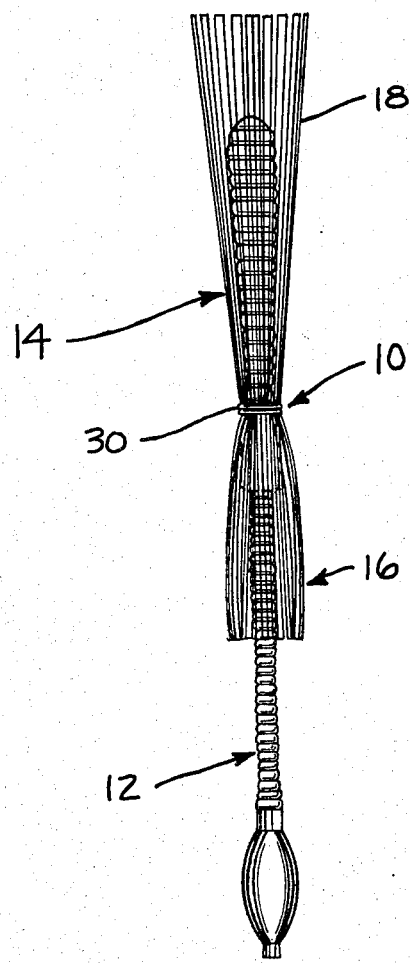
FIG. 1 is a plan view showing a plastic worm with the inner skirt extending to the rear of the worm and the outer skirt extending forwardly.
Figure 2:
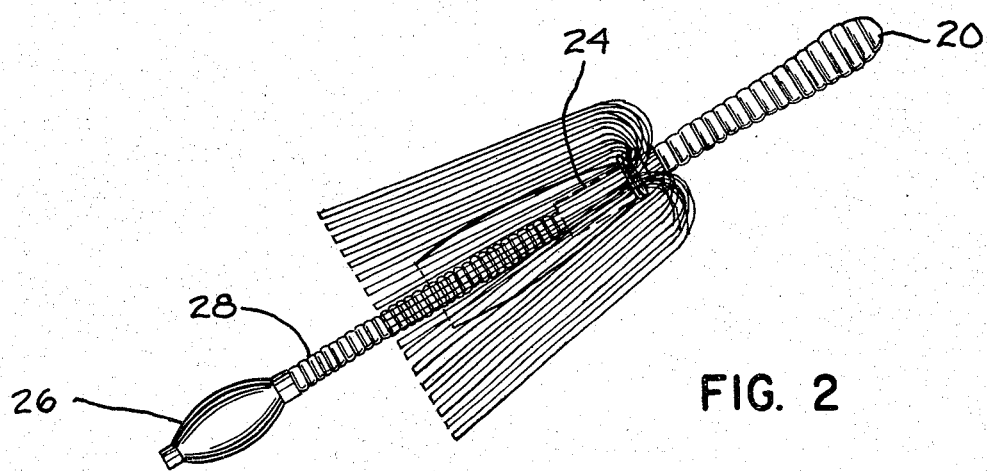
FIG. 2 is a plan view showing the action of the outer skirt extending over the rear as the lure is pulled through the water.

The skirted platic worm of this invention is generally indicated by the reference numeral 10 in FIGS. 1 and 2. It is comprised of a plastic worm body 12 and a double action skirt 14 having an inner skirt 16 and a longer outer skirt 18.

The plastic worm body 12 is comprised of a head 20 at the end of a head section 22, an intermediate gland 24 or sex band and a tail 26 at the end of a rear tail section 28. It may be made in conventional fashion by molding a soft yieldable flexible synthetic rubber or plastic composition as is well known in the art.

The double action skirt is simply connected to the worm body by a tie wrap 30 of nylon, nylon thread, flexible wire or the like. The entire length of the skirt may vary but is preferably about one-half the length of the plastic worm. The skirt is constructed of conventional soft shreddable pre-slit rubber in such a fashion that the inner skirt is slightly shorter than the outer skirt when the latter is doubled over to the rear as shown in FIG. 2. Thus, the tie wraps may be wrapped around the skirt to provide an inner skirt of about two-thirds the length of the outer skirt to effect the proportional relationship shown in FIG. 1.

The connection of the tie wrap to the worm body is made at the gland or sex band 24. As shown in FIGS. 1 and 2 this connection is made at the forward end of the gland which provides a portion of substantial strength and also locates the action of the skirt adjacent the forward portion of the worm in the area where the hook is normally inserted for greater effectiveness in impaling the fish when it strikes at the lure.

Figure 3:
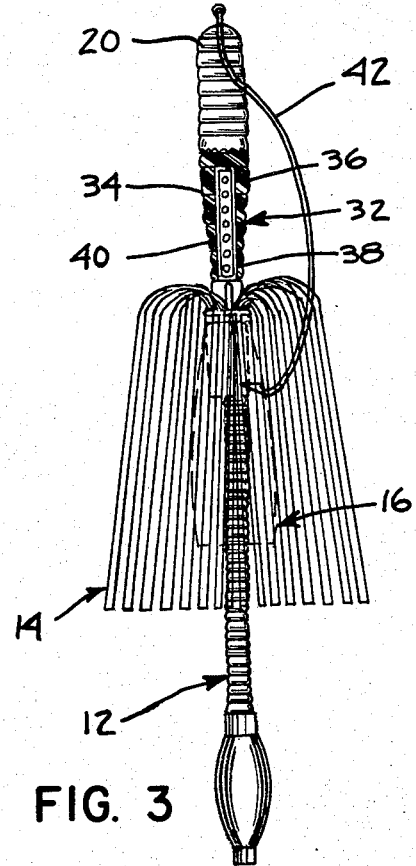
FIG. 3 is a view partly in axial cross-section showing the worm with the molded in-situ sound chamber.

The glass sound chamber lure is shown in FIG. 3. The glass sound chamber is generally indicated by the reference numeral 32 and is comprised of a hollow glass tube 34 having sealed ends 36 and 38. It is partially filled with metallic shot 40 of steel or the like to provide a metallic rattling noise when it is moved. The steel shot against the glass tube makes a sharp impact and sound but it will be understood that other materials of construction may be used which provide a similar sound and vibration when the small metallic balls or shot hit the walls of the sound chamber.

The sound chamber is molded into the head portion 22 of the plastic worm in-situ during the molding operation employed in constructing the plastic worm. It is located preferably about an inch or so behind the head. This location permits a hook to be inserted through the head by the fisherman in the usual fashion and moved through the head section past the sound chamber with the barb being embedded in the gland behind the sound chamber. This location centers the sound vibration at the working end of the hook and an attacking bass or other fish striking at the source of the sound vibrations is designed to be snagged by the hook.

The sound chamber is most effectively employed with the double action skirt as shown in FIGS. 1 and 2. It may where desired be employed alone.

USE

The double action skirted plastic worm of this invention is used in the same fashion as a conventional plastic worm, plastic grub or jig and eel with which fisherman are quite familiar. The lure is rigged by inserting a hook 42 through the head and turning it around in the body to face the forward end. Such riggins may be effected in either the well known Texas or Carolina rigs.

When the lure is cast upon the water surface, it starts to drop below the surface level in the fashion shown in FIG. 1. The outer skirt extends upwardly toward the worm head to provide a mushroom appearance as the lure drops downwardly while the inner skirt depending on the speed of drop will extend downwardly or move toward the head of the worm.

When the lure is retrieved through the water the longer outer skirt tends to be moved toward the tail end of the worm as shown in FIG. 2. The movement of the outer skirt is thus dependent on the speed of movement through the water and the direction of movement, vertical or horizontal, to effect its movement which may be constantly changed by twitching the line, spasmodic retrieve and the like.

The skirted worm lure may very efficiently be fished weightless in lilly pads, moss or the like. The double action inner and outer skirts act as a weedless lure to spread out the weight of the lure and avoid hang up. Buoyancy is also provided by the double action skirt.

The plastic worm provided with the molded in-situ sound chamber as shown in FIG. 3 is fished in a like manner as previously described. Fish are known to respond to vibration as well as sight. In murky water or heavy cover the rattling sound of the shot in the sound chamber tends to attract the bass or other fish and aid them in locating the lure. The sealed sound chamber which has a specific gravity less than that of water further adds buoyancy to the head of the worm which avoids the "head heavy" aspect of conventional plastic worms, especially those that are rigged with a slip sinker.

Various changes and modifications may be made within this invention as will be apparent to those skilled in the art. Such changes and modifications are within the scope and teaching of this invention as defined in the claims appended hereto.

What is claimed is:

1. A plastic worm fishing lure comprising an elongated soft flexible plastic worm body having a head at one end, and a tail at a second end of the body, said body supporting a skirt attached to the body intermediate the head and tail of said worm, said skirt being comprised of an inner skirt and an outer skirt section each comprising flexible rubber-like strands, said inner skirt extending in a rearward direction with respect to the plastic worm body from means connecting the skirt to said body and said outer skirt extending forwardly from said connecting means and being doubled over said inner skirt when the lure is pulled through the water, said outer skirt being substantially longer than said inner skirt and extending beyond a rear portion of said inner skirt when the outer skirt is doubled over said inner skirt.

2. The fishing lure of claim 1 in which said connecting means is comprised of a binding wrapped around said skirt to secure the skirt to said body.

3. The fishing lure of claim 1 in which the connecting means is located at an intermediate gland portion formed on said worm body.

4. The fishing lure of claim 1 in which the total length of the inner and outer skirts is substantially one-half the length of the worm body.

5. The fishing lure of claim 1 in which said connecting means is comprised of a binding wrapped around said skirt to secure the skirt to said body and the connecting means is located at an intermediate gland portion formed on said worm body.

6. The fishing lure of claim 1 in which said connecting means is comprised of a binding wrapped around said skirt to secure the skirt to said body and the connecting means is located at an intermediate gland portion formed on said worm body and the total length of the inner and outer skirts is substantially one-half the length of the worm body.

7. The fishing lure of claim 5 in which said body has molded in-situ a sound chamber, said sound chamber being comprised of a sealed rigid hollow housing partially filled with metallic shot or the like and said sound chamber is located between the head of said worm and an intermediate gland formed in the worm body.

8. The fishing lure of claim 6 in which said body has molded in-situ a sound chamber, said sound chamber being comprised of a sealed rigid hollow housing partially filled with metallic shot or the like and said sound chamber is located between the head of said worm and an intermediate gland formed in the worm body and said sound chamber housing is comprised of a section of hollow glass tubing sealed at opposite ends of the tubing, said housing being axially aligned with the body of said worm 9. A plastic worm fishing lure comprising an elongated soft flexible plastic worm body having a head at one end and a tail at a second end of the body, said body having molded in-situ a sound chamber, said sound chamber being comprised of a sealed rigid hollow housing partially filled with metallic shot or the like and located between the head of said worm and an intermediate gland formed in the worm body and having sufficient buoyancy to raise the head end of said worm with respect to the tail end when the worm is immersed in water.

10. A flexible worm fishing lure comprising an elongated soft flexible plastic worm body having a head at one end, and a tail at a second end of the body, said body supporting a skirt attached to the body intermediate the head and tail of said worm, said skirt being comprised of an inner skirt and an outer skirt section each comprising flexible rubber-like strands, said inner skirt extending in a rearward direction with respect to the plastic worm body from means connecting the skirt to said body and said outer skirt extending forwardly from said connecting means and being doubled over said inner skirt when the lure is pulled through the water, said body having molded in-situ a sound chamber, said sound chamber being comprised of a sealed rigid hollow housing partially filled with metallic shot or the like located between the head of said worm and an intermediate gland formed in the worm body and having sufficient buoyancy to raise the head end of the body when the worm is immersed in water.

* * * * *